US010985356B2

(12) United States Patent
Joo et al.

(10) Patent No.: US 10,985,356 B2
(45) Date of Patent: Apr. 20, 2021

(54) COMPOSITE SEPARATION MEMBRANE FOR LITHIUM SECONDARY BATTERY AND MANUFACTURING METHOD THEREFOR

(71) Applicants: SK Innovation Co., Ltd., Seoul (KR); SK IE Technology Co., Ltd., Seoul (KR)

(72) Inventors: Dong Jin Joo, Daejeon (KR); Su Ji Lee, Daejeon (KR); Kyu Young Cho, Daejeon (KR); Yun Bong Kim, Daejeon (KR); Jae Woong Kim, Daejeon (KR)

(73) Assignees: SK Innovation Co., Ltd., Seoul (KR); SK IE Technology Co., Ltd., Seoul (KR)

( * ) Notice: Subject to any disclaimer, the term of this patent is extended or adjusted under 35 U.S.C. 154(b) by 169 days.

(21) Appl. No.: 15/562,519

(22) PCT Filed: Apr. 1, 2016

(86) PCT No.: PCT/KR2016/003420
§ 371 (c)(1),
(2) Date: Sep. 28, 2017

(87) PCT Pub. No.: WO2016/159720
PCT Pub. Date: Oct. 6, 2016

(65) Prior Publication Data
US 2018/0097216 A1 Apr. 5, 2018

(30) Foreign Application Priority Data

Apr. 2, 2015 (KR) .................. 10-2015-0046671
Mar. 31, 2016 (KR) .................. 10-2016-0039554

(51) Int. Cl.
  *H01M 2/16* (2006.01)
  *H01M 2/14* (2006.01)
  *H01M 10/02* (2006.01)
  *H01M 10/0525* (2010.01)
  *H01M 10/42* (2006.01)
  *H01M 10/052* (2010.01)

(52) U.S. Cl.
  CPC ......... *H01M 2/1686* (2013.01); *H01M 2/145* (2013.01); *H01M 2/16* (2013.01); *H01M 2/166* (2013.01); *H01M 2/1653* (2013.01); *H01M 10/02* (2013.01); *H01M 10/0525* (2013.01); *H01M 10/4235* (2013.01); *H01M 10/052* (2013.01); *H01M 2220/20* (2013.01); *Y02E 60/10* (2013.01)

(58) Field of Classification Search
None
See application file for complete search history.

(56) References Cited

U.S. PATENT DOCUMENTS

| 8,426,053 B2 | 4/2013 | Lee et al. | |
|---|---|---|---|
| 2009/0263571 A1 | 10/2009 | Hennige et al. | |
| 2010/0015530 A1 | 1/2010 | Katayama et al. | |
| 2013/0089772 A1* | 4/2013 | Nishikawa | H01M 2/1653 429/145 |
| 2013/0244082 A1* | 9/2013 | Lee | H01M 4/622 429/145 |
| 2013/0280583 A1* | 10/2013 | Lee | H01M 2/1686 429/144 |
| 2013/0316219 A1 | 11/2013 | Ha et al. | |
| 2013/0330590 A1 | 12/2013 | Toyoda | |
| 2014/0308565 A1* | 10/2014 | Lee | H01M 4/621 429/144 |
| 2015/0333308 A1 | 11/2015 | Toyoda et al. | |

FOREIGN PATENT DOCUMENTS

| JP | H11185733 A | 7/1999 |
|---|---|---|
| JP | 2001135295 A | 5/2001 |
| JP | 2006507636 A | 3/2006 |
| JP | 5355823 B1 | 11/2013 |
| JP | 2014509777 A | 4/2014 |
| JP | 2014530472 A | 11/2014 |
| JP | 2014534570 A | 12/2014 |
| JP | 201528842 A | 2/2015 |
| JP | 201541603 A | 3/2015 |
| JP | 2016119222 A | 6/2016 |
| KR | 1020070113374 A | 11/2007 |
| KR | 1020110057079 A | 5/2011 |
| KR | 1020130110848 A | 10/2013 |
| KR | 1020130136149 A | 12/2013 |
| WO | 2008114727 A1 | 9/2008 |
| WO | 2012115252 A1 | 8/2012 |
| WO | 2013151144 A1 | 10/2013 |
| WO | 2014142450 A1 | 9/2014 |
| WO | 2017033993 A1 | 3/2017 |

* cited by examiner

*Primary Examiner* — Yoshitoshi Takeuchi
(74) *Attorney, Agent, or Firm* — The Webb Law Firm

(57) ABSTRACT

The present invention relates to a composite separation membrane for a lithium secondary battery, having an excellent effect of improving the life time and safety of a battery and a lithium secondary battery including the membrane. The composite separation membrane includes a porous base layer; a heat-resistant layer formed on one side or both sides of the porous base layer; and a fusion layer formed on an outermost layer. The heat-resistant layer includes inorganic particles connected and fixed by binder polymers, and the fusion layer includes crystalline polymers in the form of particles having a melting temperature of 100° C. or higher.

9 Claims, No Drawings

COMPOSITE SEPARATION MEMBRANE FOR LITHIUM SECONDARY BATTERY AND MANUFACTURING METHOD THEREFOR

CROSS-REFERENCE TO RELATED APPLICATIONS

This application is the United States national phase of International Application No. PCT/KR2016/003420 filed Apr. 1, 2016, and claims priority to Korean Patent Application Nos. 10-2015-0046671 and 10-2016-0039554, filed Apr. 2, 2015 and Mar. 31, 2016, respectively, the disclosures of which are hereby incorporated in their entirety by reference.

TECHNICAL FIELD

The present invention relates to a composite separation membrane for a lithium secondary battery having an improved life time and safety of a battery, and a manufacturing method therefor.

BACKGROUND ART

A lithium secondary battery is required to have higher quality stability and uniformity according to high capacity and high output of a lithium secondary battery such as a battery for a hybrid vehicle, or the like. Accordingly, various methods for imparting functionality to a porous thin film type film formed of polyethylene or polypropylene, which is a separation membrane used in the lithium secondary battery, have been attempted.

Recently, a percentage of using a pouch-type battery of which a shape is easily changed has been increased, and the capacity of the battery has been gradually increased. Unlike the prismatic battery or the cylindrical battery, the pouch-type battery encloses a battery with a pouch in a loose film form, which allows an increased area of an electrode plate, and as a result, battery capacity is increased. In this case, when the battery is charged and discharged for a long period of time, a cathode electrode plate and an anode electrode plate are not in close contact with each other but are separated, and the battery may be bent, and thus, a life time of the battery is reduced. In order to solve these problems, adhesive property may be provided to the separation membrane to improve adhesion with the electrode, thereby preventing separation of the electrode plates or deformation of the battery, and thus, it is possible to improve the life time of the pouch-type battery.

When heat stability of a polyolefin-based separation membrane is reduced, a short-circuit between the electrodes accompanied with damage or deformation of the separation membrane may occur due to temperature rise caused by abnormal behavior of the battery, and further, there is a risk of overheating, ignition or explosion of the battery. In recent years, it is becoming more difficult to secure safety of the battery due to an increase in the battery capacity, but there is a growing demand for a safe battery, and accordingly, an approach to improve the safety of the battery by imparting a separate property in addition to the above-described adhesive property to the separation membrane, is in progress.

As a technique relating to the adhesive property, various techniques for increasing the adhesive property between the electrode and the separation membrane have been proposed. As one of such techniques, a technique relating to a separation membrane including an adhesion layer formed by using a polyvinylidene fluoride resin in a conventional polyolefin-based separation membrane, has been proposed.

Japanese Patent Publication No. 5355823 discloses a separation membrane including an adhesion layer formed of a polyvinylidene fluoride resin on at least one surface of a polyolefin separation membrane base. The above-described technology attempts to improve both heat stability and adhesive property of the separation membrane by including the adhesion layer. However, there are problems in that since a heat-resistant layer is not included, heat resistance is insufficient, and since a thickness of the adhesion layer is too thick, it is not appropriate for the requirement for thinning of the battery, and it is still necessary to improve bonding strength with the electrodes, and it is also required to improve prolongation of a battery life time.

DISCLOSURE

Technical Problem

An object of the present invention is to provide a novel composite separation membrane for a lithium secondary battery in which adhesive property with an electrode is excellent, ion flow according to charging and discharging is smooth, thereby having excellent output of a battery, excellent heat resistance so that the separation membrane is not deformed, and improved life time of the battery, and a manufacturing method therefor.

Technical Solution

In one general aspect, a composite separation membrane for a lithium secondary battery includes:
a porous base layer;
a heat-resistant layer including inorganic particles connected and fixed by a binder polymer, and formed on the porous base layer, and
a fusion layer including crystalline polymers in a form of particles having a melting temperature of 100° C. or higher, and formed on the heat-resistant layer,
wherein the inorganic particles and the crystalline polymer satisfy Equation 1 below:

$$1.5 \leq D_1/D_2 \qquad \text{[Equation 1]}$$

in Equation 1, $D_1$ is an average particle diameter of the inorganic particles of the heat-resistant layer, and $D_2$ is an average particle diameter of the crystalline polymer particles of the fusion layer.

The composite separation membrane for a lithium secondary battery may further include: an interfacial layer formed between the heat-resistant layer and the fusion layer and having the inorganic particles and crystalline polymer particles mixed therein.

Further, it is possible to provide a composite separation membrane in which life time of a battery is further improved and electrical properties are excellent by maintaining surface roughness of the composite separation membrane to be 0.3 μm or less.

In the composite separation membrane, the heat-resistant layer and the fusion layer may be mixed and adhered to each other at a predetermined thickness at an interface by simultaneous coating performed by applying the heat-resistant layer coating liquid, and then applying the fusion layer coating liquid without drying the heat-resistant layer coating liquid.

In the present invention, the heat-resistant layer includes 60 to 99 wt % of the inorganic particles and 40 to 1 wt % of the binder polymer based on 100 wt % of the total weight of the composition. The inorganic particle preferably has a size of 0.1 to 2.0 μm, and may be one or two or more selected from aluminum oxides such as alumina, boehmite, etc., barium titanium oxide, titanium oxide, magnesium oxide, and clay glass powder, but is not necessarily limited thereto.

Examples of the binder of the heat-resistant layer in the present invention may include one or two or more selected from polyvinylidene fluoride-hexafluoropropylene (PVdF-HFP), polymethyl methacrylate (PMMA), polyacrylonitrile (PAN), polyvinylpyrrolidone, polyimide, polyethylene oxide (PEO), cellulose acetate, polyvinyl alcohol (PVA), carboxymethylcellulose (CMC), etc., but the binder of the heat-resistant layer is not necessarily limited thereto.

In the present invention, the crystalline polymer particles having a melting temperature of 100° C. or higher of the fusing layer are not limited as long as they are polymers having a crystallinity of the melting temperature or higher. For example, the crystalline polymer particles are preferably any one or two or more polymers selected from polyacrylonitrile (PAN), polyvinylidene fluoride (PVdF), polystyrene (PS), a mixture thereof, etc., but are not limited thereto.

Under the above-described condition, life time of the battery may be prolonged, and in particular, adhesive force between an electrode and the fusion layer may be remarkably increased, and safety of the battery may also be increased.

In the present invention, a size of the crystalline polymer particles is preferably 0.05 to 0.8 μm in achieving the object of the present invention. It is preferable that the fusion layer may have a thickness of 2.0 μm or less.

Further, in the present invention, it was confirmed that when the inorganic particles used in the heat-resistant layer were further added, the fusion layer imparted more excellent adhesive property to exhibit excellent results in safety and performance of the battery. In this case, the inorganic particles preferably have a content of 30 vol % or less with respect to a content of the total particles of the fusion layer.

Further, in the present invention, when the composite separation membrane is fused with an electrode, fusion may be performed both in a state where an electrolyte is included and in a state where the electrolyte is not included. A case where the composite separation membrane is fused with the electrode while including the electrolyte Is more effective in implementing fusion force.

In particular, unlike a pouch-type battery, in the case of a cylindrical battery and a prismatic battery, the electrode and the separation membrane, which are constituent elements, are included in a hard cylinder or a can, but are not able to be fused by applying temperature and pressure after the battery is assembled, and thus, the present invention is effective when the fusion is performed by fusing the electrode and the separation membrane in advance, putting the fused electrode and separation membrane in a cylinder or a can, and injecting the electrolyte thereinto.

Advantageous Effects

The composite separation membrane for a lithium secondary battery according to the present invention may have excellent life time and heat stability of a lithium secondary battery, may be uniformly adhered to an anode and a cathode of the secondary battery having a wide area, and may have smooth ion mobility through uniformly distributed pores in each layer, thereby having excellent output characteristics. In particular, the composite separation membrane according to the present invention may be introduced to improve performance of a large-sized lithium secondary battery used in electric vehicles, etc.

BEST MODE

Hereinafter, the present invention is described in detail. Examples and drawings to be described below are provided by way of example so that the idea of the present invention can be sufficiently transferred to those skilled in the art to which the present invention pertains. Meanwhile, unless technical and scientific terms used herein are defined otherwise, they have meanings that are generally understood by those skilled in the art to which the present invention pertains. Known functions and components which obscure the description and the accompanying drawings of the present invention with unnecessary detail will be omitted.

The present invention relates to a composite separation membrane for a lithium secondary battery including:

a porous base layer;

a heat-resistant layer including inorganic particles connected and fixed by a binder polymer, and formed on the porous base layer, and a fusion layer including crystalline polymers in a form of particles having a melting temperature of 100° C. or higher, and formed on the heat-resistant layer, wherein the inorganic particles and the crystalline polymer satisfy Equation 1 below:

$$1.5 \leq D_1/D_2 \qquad \text{[Equation 1]}$$

in Equation 1, $D_1$ is an average particle diameter of the inorganic particles of the heat-resistant layer, and $D_2$ is an average particle diameter of the polymer particles of the fusion layer, and adhesive force with an electrode may be remarkably improved within the range of $1.5 \leq D_1/D_2$. Further, permeability of the composite separation membrane may be further increased, and heat resistance and mechanical strength may be remarkably increased.

In the present invention, the composite separation membrane for a lithium secondary battery may further include: an interfacial layer formed between the heat-resistant layer and the fusion layer and having the inorganic particles and crystalline polymer particles mixed therein, and a thickness of the interfacial layer may be 40% or less of a thickness of the fusion layer.

In the present invention, any one of a case where the fusion layer is stacked on one side of the heat-resistant layer and a case where the fusion layers are stacked on both sides of the heat-resistant layer may be included in the scope of the present invention as long as the fusion layer is stacked on the heat-resistant layer.

Further, according to another aspect of the present invention, it is possible to manufacture a composite separation membrane capable of providing a high energy battery in which life time of a battery is further improved and electrical properties are excellent by maintaining surface roughness of the composite separation membrane to be 0.3 μm or less. This is because it is possible to improve electrical properties of the battery by uniformly forming adhesion with the electrode.

In the present invention, the porous base layer is not limited as long as it is a polyolefin-based microporous membrane. Further, the porous base layer is not particularly limited as long as it is a porous membrane which is capable of being applied to a battery while having pores inside a nonwoven fabric, paper, and a microporous film thereof or having pores with inorganic particles on a surface thereof.

The polyolefin-based resin is preferably at least one polyolefin-based resin alone, or a mixture thereof, and in particular, is preferably at least one or two selected from polyethylene, polypropylene, and a copolymer thereof. Further, the base layer may be formed of the polyolefin resin alone or may be formed by further including inorganic particles or organic particles while including the polyolefin resin as a main component. Otherwise, the base layer may be formed by constituting the polyolefin-based resin into multiple layers, and it is not excluded that any one or all of the base layers constituted in multiple layers include inorganic particles and organic particles in the polyolefin resin.

A thickness of the porous base layer is not particularly limited, but may be preferably 5 to 30 μm. The porous base layer is a porous polymer film mainly formed by stretching.

A manufacturing method for a polyolefin-based porous base layer according to an exemplary embodiment of the present invention is not limited as long as the polyolefin-based porous base layer is manufactured by a person skilled in the art, but in an exemplary embodiment, the polyolefin-based porous base layer may be manufactured by a dry method or a wet method. The dry method is a method in which micropores are formed by forming a polyolefin film and then stretching the film at a low temperature, which causes micro cracks between lamellas which are crystalline parts of polyolefin. The wet method is a method in which a polyolefin-based resin and a diluent are kneaded at a high temperature at which the polyolefin-based resin is melted to form a single phase, the polyolefin and the diluent are subjected to phase-separation during a cooling process, and then, the diluent is extracted to form pores therein. The wet method is a method of imparting mechanical strength and transparency through a stretching/extraction process after a phase separation process, which may be more preferable because a film thickness is thin, a pore size is uniform, and physical properties are excellent as compared to the dry method.

The diluent is not limited as long as it is an organic material which forms the single phase with the polyolefin-based resin. Examples of the diluent may include aliphatic hydrocarbons such as nonane, decane, decalin, paraffin oil, paraffin wax, etc., phthalic acid esters such as dibutyl phthalate, dioctyl phthalate, etc., and C10-C20 fatty acids such as palmitic acid, stearic acid, oleic acid, linoleic acid, linolenic acid, etc., and C10-C20 fatty acid alcohols such as palmitic acid alcohol, stearic acid alcohol, oleic acid alcohol, etc., a mixture thereof, etc.

Hereinafter, the heat-resistant layer of the present invention will be described in detail, but the present invention is not limited thereto.

In the present invention, the heat-resistant layer is bonded to the base layer by mixing a small amount of binder with inorganic particles, and thus, heat stability, electrical safety, and electrical characteristics of the battery may be increased, and further, shrinkage of the base layer occurred at a high temperature may be suppressed.

A size of the inorganic particles of the heat-resistant layer is not largely limited, but it is preferable to mix the binder polymer with the inorganic particles having a size of 0.1 to 2.0 μm and coat the mixture on one side or both sides of the base layer to have a thickness of 1 to 10 μm in that the desirable effect of the present invention may be easily achieved.

The heat-resistant layer may include 60 to 99 wt % of inorganic particles and 40 to 1 wt % of binder polymer based on 100 wt % of the total weight of the composition. Within the above-described contents, it is preferable in that performance of the battery may be effectively achieved.

The inorganic particles included in the heat-resistant layer are rigid so that deformation does not occur due to external impact or force, and heat deformation and side reactions even at high temperature are prevented from occurring. The inorganic particles included in the heat-resistant layer are preferably one or two or more selected from the group consisting of alumina, boehmite, aluminum hydroxide, titanium oxide, barium titanium oxide, magnesium oxide, magnesium hydroxide, silica, clay, and glass powder, but are not limited thereto.

The binder polymer included in the heat-resistant layer in the present invention acts as a binder for connecting and stably fixing the inorganic particles, and is preferably one or two or more selected from the group consisting of polyvinylidene fluoride (PVdF), polyvinylidene fluoride-hexafluoropropylene (PVdF-HFP), polymethyl methacrylate (PMMA), polyacrylonitrile (PAN), polyvinylpyrrolidone, polyimide, polyethylene oxide (PEO), cellulose acetate, polyvinyl alcohol (PVA), carboxymethyl cellulose (CMC), and polybutyl acrylate, but is not limited thereto. The heat-resistant layer may further include an acrylic polymer or a butadiene-based polymer to improve adhesive force, as needed.

The solvent used for forming the heat-resistant layer of the present invention is not largely limited as long as it is able to dissolve the binder and disperse the inorganic particles, but for example, may be one or two or more selected from water, methanol, ethanol, 2-propanol, acetone, tetrahydrofuran, methyl ethyl ketone, ethyl acetate, N-methylpyrrolidone, dimethylacetamide, dimethylformamide, dimethylformamide, etc.

The heat-resistant layer has a thickness of 1 to 20 μm, preferably from 1 to 10 μm, on one side or both sides of the base layer by mixing the inorganic particles with the binder polymer, which is preferable in that heat resistance may be ensured and ion permeability is relatively high to improve battery capacity.

Next, the fusion layer of the present invention will be described.

The fusion layer according to an exemplary embodiment of the present invention is formed on the outermost layer of the composite separation membrane and is uniformly adhered to an electrode plate at a predetermined interval by adhering the electrode plate and the separation membrane, wherein any one of a case where the fusion layer is stacked on one side of the heat-resistant layer and a case where the fusion layers are stacked on both sides of the heat-resistant layer may be included in the scope of the present invention as long as the fusion layer is stacked on the heat-resistant layer. Specifically, a stacked form of the fusion layer/the heat-resistant layer/the porous base layer/the heat-resistant layer/the fusion layer, a stacked form of the fusion layer/porous base layer/heat-resistant layer/fusion layer, and a stacked form of the porous base layer/heat-resistant layer/fusion layer, etc., may be implemented, but the present invention is not limited to the stacked form.

The fusion layer of the present invention includes the crystalline polymer particles having a melting temperature of 100° C. or higher, and thus, the electrode plate and the fusion layer of the composite separation membrane may be firmly adhered to each other, and adhesive force in the total area of a cathode electrode plate and an anode electrode plate may be increased, thereby strongly and uniformly and constantly forming close adhesion between the anode and the cathode, and thus, performance and life time of the battery may be remarkably increased.

In the present invention, since the fusion layer is formed in the form of crystalline polymer particles having a high melting temperature, battery life time may be excellent in addition to high fusion property, and there is an excellent effect that local adherence failure is not caused, and thus, properties of the battery may be increased.

Further, the fusion layer of the present invention may be manufactured by using the crystalline polymer in the form of particles, and thus, when liquid electrolyte is impregnated, a high degree of swelling of electrolyte may be exhibited even though it cannot be clearly explained.

The crystalline polymer in the form of particles may have a melting temperature of 100° C. or higher, 100 to 350° C., preferably 120 to 350° C., and more preferably 150 to 350° C. Within the above-described range, it is preferable in that mobility of ions is smooth, gas permeability is excellent, and the life time of the battery is improved. This is because the adhesion of the separation membrane with the electrode is mostly performed at a temperature of 70 to 100° C., and in the case of a polymer having a melting temperature lower than 100° C., the polymer in the form of particles is melted in the adhesion process and blocks pores present in the heat-resistant layer or the base layer to interfere with transfer of lithium ions.

The adhesion force between the composite separation membrane and the electrode of the present invention shows remarkable close adhesive property in which the adhesive strength with the electrode is 10 gf/cm or more at a temperature of 100° C. and a pressure of 1 MPa.

The crystalline polymer in the form of particles included in the fusion layer of the present invention is not particularly limited as long as the melting temperature is 100° C. or higher, but for example, is preferably any one or two or more polymers selected from polyacrylonitrile (PAN)-based polymer, polyvinylidene fluoride (PVdF)-based polymer, polystyrene (PS)-based polymer, a mixture thereof, etc., but is not limited thereto.

In the present invention, the fusion layer may be coated on both sides of the outermost layer of the composite separation membrane at a thickness of 0.1 to 2.0 μm, preferably 0.1 to 1.0 μm. Within the above-described range, it is possible to smoothly move lithium ions and to prevent an increase in resistance in the separation membrane.

According to an exemplary embodiment of the present invention, at the time of satisfying a condition in which the crystalline polymer in the form of particles has a melting temperature of 100° C. or higher, and a condition in which the size of the inorganic particles of the heat-resistant layer and the particle size of the crystalline polymer in the fusion layer satisfy Equation 1 below, it is possible to manufacture a composite separation membrane in which adhesive property with the electrode is remarkably increased, capacity and output are increased, and heat resistance and mechanical strength are excellent:

$$1.5 \leq D_1/D_2 \quad \text{[Equation 1]}$$

in Equation 1, $D_1$ is an average particle diameter of the inorganic particles of the heat-resistant layer, and $D_2$ is an average particle diameter of the polymer particles of the fusion layer.

Preferably, as a more specific example satisfying the range of $1.5 \leq D_1/D_2$, $1.5 \leq D_1/D_2 \leq 5.0$, but the upper limit is not necessarily limited thereto.

In addition, in the present invention, the surface roughness (Ra) is 0.3 μm or less, and thus, it is more preferable in that close adhesive property is further increased and life time of the battery is improved.

According to an exemplary embodiment of the present invention, the average particle diameter of the inorganic particles included in the heat-resistant layer is not limited, but may have a range of 0.1 to 2 μm, and the average particle diameter of the crystalline polymer particles included in the fusion layer is not limited, but when the average particle diameter thereof is 0.05 to 0.8 μm, the desired effect of the present invention may be easily achieved.

A manufacturing method for a composite separation membrane for a lithium secondary battery according to an exemplary embodiment of the present invention may include:

applying a heat-resistant layer coating liquid including inorganic particles and a binder polymer to one side or both sides of a porous base; and applying a fusion layer coating liquid including a crystalline polymer in a form of particles having a melting temperature of 100° C. or higher on the coated heat-resistant layer coating liquid.

Here, an average particle diameter of the inorganic particles is 1.5 times or larger than an average particle diameter of the crystalline polymer particles.

Particularly, in the above-described manufacturing method, it is possible to obtain a remarkable effect by adopting a simultaneous coating method.

That is, it is preferred that the heat-resistant layer coating liquid is applied, and then the fusion layer coating liquid is sequentially applied without drying the heat-resistant layer coating liquid, thereby performing simultaneous coating. By adopting the simultaneous coating method, the coating layer of the heat-resistant layer and the coating layer of the fusion layer may be allowed to freely move, thereby being mixed and adhered at a predetermined thickness at the interface of the two layers, and thus, a surface of the fusion layer may be coated very uniformly, and the heat-resistant layer and the fusion layer may be semi-permanently adhered.

Accordingly, the composite separation membrane may further include an interfacial layer in which the inorganic particles and the crystalline polymer particles are mixed between the heat-resistant layer and the fusion layer, and a thickness of the interfacial layer may be 40% or less of a thickness of the fusion layer.

Therefore, the composite film of the present invention is not damaged by long-term use at the stacked interface of each layer, and thus, a long life time of the battery is remarkably increased. When the composite separation membrane is manufactured by coating and drying the heat-resistant layer, and then coating and drying the fusion layer, it was confirmed that the long-term life time was lowered by 10%, in some cases by 30% or more due to poor adhesive property at the interface, and the frequency of battery capacity according to charging and discharging was remarkably decreased.

The solvent used in the coating solution for forming the heat-resistant layer or the fusion layer of the present invention is not particularly limited, but for example, may be one or more selected from water, methanol, ethanol, 2-propanol, acetone, tetrahydrofuran, methyl ethyl ketone, ethyl acetate, N-methylpyrrolidone, dimethylacetamide, dimethylformamide, etc.

The method for forming the composite separation membrane according to the present invention is not particularly limited as long as it is general methods adopted in the art.

For example, a bar coating method, a rod coating method, a die coating method, a wire coating method, a comma coating method, a micro gravure/gravure method, a dip coating method, a spray method, an ink-jet coating method, a combination method thereof, a modification method, etc., may be used. In addition, the present invention uses a multilayer coating method for the fusion layer and the heat-resistant layer, which is more preferable to increase productivity of the process.

The lithium secondary battery according to an exemplary embodiment of the present invention may be manufactured by including a composite separation membrane, a cathode, an anode, and a non-aqueous electrolyte.

The cathode and the anode may be manufactured by mixing a solvent with a cathode active material and an anode active material, if necessary, with a binder, a conductive material, a dispersing material, etc., followed by stirring to prepare a mixture, and applying the mixture to a current collector of a metal material, followed by drying and pressing.

The cathode active material is any active material that is generally used for the cathode of the secondary battery. For example, the cathode active material may be lithium metal oxide particles containing one or two or more metals selected from the group consisting of Ni, Co, Mn, Na, Mg, Ca, Ti, V, Cr, Cu, Zn, Ge, Sr, Ag, Ba, Zr, Nb, Mo, Al, Ga, B, and a combination thereof.

The anode active material is any active material that is generally used for the anode of the secondary battery. The anode active material of the lithium secondary battery is preferably a material capable of performing lithium intercalation. As a non-limiting example, the anode active material may be one or two or more materials selected from the group consisting of lithium (metal lithium), graphitizable carbon, non-graphitizable carbon, graphite, silicon, Sn alloy, Si alloy, Sn oxide, Si oxide, Ti oxide, Ni oxide, Fe oxide (FeO), and lithium-titanium oxide ($LiTiO_2$, $Li_4Ti_5O_{12}$).

As the conductive material, a conventional conductive carbon material may be used without any particular limitation.

The current collector of the metal material is a metal having high conductivity and capable of being easily adhered to the mixture of the cathode active material or the anode active material, and may be any metal as long as it is not reactive in a voltage range of the battery. Non-limiting examples of the cathode current collector may include foil made of aluminum, nickel or a combination thereof. Non-limiting examples of the anode current collector may include a foil made of copper, gold, nickel or copper alloy or a combination thereof.

A separation membrane is interposed between the cathode and the anode. As a method for applying the separation membrane to a battery, it is possible to perform lamination, stacking and folding of the separation membrane and the electrode in addition to winding which is a general method.

A non-aqueous electrolyte includes a lithium salt as an electrolyte and an organic solvent. The lithium salt may be used without limitation as long as it is generally used for an electrolyte for a lithium secondary battery, and may be represented by $Li^+X^-$.

Anion ions of the lithium salt are not particularly limited, but may be any one or two or more selected from $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

Examples of the organic solvent may include any one or a mixture of two or more selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxyethane, diethoxyethane, sulfolane, gamma-butyrolactone, and tetrahydrofuran.

The non-aqueous electrolyte may be injected into an electrode structure composed of a cathode, an anode, and a separation membrane interposed between the cathode and the anode.

An external shape of the lithium secondary battery is not particularly limited, but may be a cylindrical shape, a prismatic shape, a pouch shape, a coin shape, or the like, using a can.

Hereinafter, Examples will be provided in order to describe the present invention in more detail. However, the present invention is not limited to Examples below.

Properties of each of the composite separation membranes and the lithium secondary batteries manufactured according to Examples and Comparative Examples of the present invention were evaluated by the following test methods.

1. Measurement of Gas Permeability

A method for measuring gas permeability of the separation membrane was conducted according to JIS P8117 standard, and time required for passing 100 cc of air through an area of 1 $inch^2$ of the separation membrane was recorded in seconds and compared.

2. Measurement of Heat Shrinkage Ratio at 130° C.

The method for measuring a heat shrinkage ratio at 130° C. of the separation membrane was as follows: a separation membrane was cut into a square shape having a side length of 10 cm to prepare a sample, and an area of the sample before the experiment was measured and recorded using a camera. Five sheets of paper were placed at the top and bottom of the sample, respectively, so that the sample is in the center, and then four sides of the paper were fixed with a clip. The sample wrapped in paper was left in a 130° C. hot air drying oven for 1 hour. Once the sample was left in the oven for 1 hour, the sample was taken out, and the area of the separation membrane was measured using a camera to calculate a shrinkage ratio according to Equation 1 below:

Shrinkage ratio (%)=(area before heating−area after heating)×100/area before heating [Equation 1]

3. Measurement of Adhesive Strength

A sample for measuring a fusion force between the separation membrane and the electrode was prepared as follows: one sheet of the separation membrane was inserted between the cathode electrode plate and the anode electrode plate, immersed in an electrolyte for 1 hour, taken out, and placed immediately in a hot press, and fused by applying heat and pressure at 100° C. and 1 MPa for 150 seconds. The prepared sample was immersed again in the electrolyte for 1 hour, and taken out, and then a 180° peel strength was measured immediately before the electrolyte was evaporated.

4. Measurement of Life Time of Battery

Each battery manufactured through the above-described assembling process was charged and discharged 500 times at a discharge rate of 1 C, and a discharge capacity thereof was measured to conduct a cycle evaluation for measuring a degree at which the capacity was reduced as compared to an initial capacity.

5. Measurement of Thickness of Battery

In order to confirm a separation phenomenon between the electrode plate and the separation membrane and the deformation of the battery when the battery was charged and discharged, a thickness of the battery was measured after 500 cycles of charging and discharging, using a Thickness Gauge manufactured by Mitsutoyo. Then, the measured thickness was compared with a thickness before the charging and discharging, and an increase rate in the battery thickness was measured according to Equation 2 below:

Increase rate in battery thickness (%)=(B−A)/A×100 [Equation 2]

A: Battery thickness before charging and discharging (mm)

B: Battery thickness after charging and discharging (mm)

6. Evaluation of Surface Roughness (Ra)

A separation membrane having a size of 5×5 µm was prepared as a sample, and Ra value was measured based on a total size of the sample by Roughness Analysis using AFM (Digital Instruments Nanoscope V MMAFM-8 Multimode).

7. Evaluation of Penetration of Battery

In order to measure the safety of the battery, each manufactured battery was fully charged with SOC (charge rate) of 100%, and nail penetration evaluation was performed. Here, a diameter of the nail was 3.0 mm, and a penetration speed of the nail was fixed to 80 mm/min. L1: no change, L2: slight heat generation, L3: leakage, L4: fuming, L5: ignition, L1 to L3: pass, L4 to L5: fail.

EXAMPLE 1

Manufacture of Cathode 94 wt % of LiCoO2 (D50, 15 µm), 2.5 wt % of polyvinylidene fluoride, and 3.5 wt % of carbon black (D50, 15 µm) were added to NMP (N-methyl-2-pyrrolidone) and stirred to prepare a uniform cathode slurry. The slurry was coated on an aluminum foil having a thickness of 30 µm, dried and pressed to manufacture a cathode electrode plate having a thickness of 150 µm.

Manufacture of Anode 95 wt % of graphite, 3 wt % of acrylic latex (solid content of 20 wt %) having Tg of −52° C., and 2 wt % of CMC (carboxymethyl cellulose) were added to water as a solvent and stirred to prepare a uniform anode slurry. The slurry was coated on a copper foil having a thickness of 20 µm, dried and pressed to manufacture an anode electrode plate having a thickness of 150 µm.

Manufacture of Composite Separation Membrane 94 wt % of alumina particles having an average particle diameter of 1.0 µm, 2 wt % of polyvinyl alcohol having a melting temperature of 220° C. and a saponification degree of 99%, 4 wt % of acrylic latex (solid content of 20 wt %) having Tg of −52° C. were added to water as a solvent and stirred to prepare a uniform slurry for a heat-resistant layer.

Polymer particles including polyvinylidene fluoride (PVdF) having a melting temperature of 162° C. as a main component and maintaining a spherical shape having an average particle diameter of 0.3 µm when dispersed in water were diluted to a ratio of 20 wt % as compared to water, and used as a slurry for a fusion layer.

The heat-resistant layer slurry and the fusion layer slurry were continuously coated on one side of a base, i.e., a polyolefin microporous membrane (porosity of 35%) having a thickness of 7 µm manufactured by SK Innovation, using a multilayer slot coating die without a separate drying step, and then, the other side of the base was coated with only the fusion layer slurry, using a single layer slot coating die. Water as the solvent in the separation membrane was evaporated through a drier, and the separation membrane was wound in a roll form. The one side heat-resistant layer had a thickness of 3 µm, and the fusion layer had a thickness of 0.8 µm, respectively.

Manufacture of Battery

A pouch type battery was assembled by stacking the cathode, anode, and separation membrane manufactured as above. An electrolyte in which ethylene carbonate (EC)/ ethyl methyl carbonate (EMC)/dimethyl carbonate (DMC) having a volume ratio of 3:5:2 were dissolved in 1M of lithium hexafluorophosphate (LiPF$_6$), was injected into the assembled battery to manufacture a lithium secondary battery having a capacity of 1,500 mAh. Then, in order to fuse the cathode, anode, and separation membrane to each other, the battery was placed in a hot press, and heat-fused by applying heat and pressure at 100° C. and 1 MPa for 150 seconds.

EXAMPLE 2

Example 2 was performed in the same manner as in Example 1 except that both the heat-resistant layer and the fusion layer were formed on both sides of the base layer.

EXAMPLE 3

Example 3 was performed in the same manner as in Example 1 except that the separation membrane was manufactured as follows.

94 wt % of boehmite particles having an average particle diameter of 0.7 µm, 2 wt % of polyvinyl alcohol having a melting temperature of 220° C. and a saponification degree of 99%, 4 wt % of acrylic latex having Tg of −52° C. were added to water as a solvent and stirred to prepare a uniform slurry for a heat-resistant layer.

Polymer particles including polyacrylonitrile (PAN) having a melting temperature of 310° C. as a main component and maintaining a spherical shape having an average particle diameter of 0.15 µm when dispersed in water were diluted to a ratio of 12 wt % as compared to water, and used as a slurry for a fusion layer.

A polyolefin microporous membrane (porosity of 35%) having a thickness of 7 µm manufactured by SK Innovation was used as a base for coating. The heat-resistant layer slurry and the fusion layer slurry were simultaneously coated on one side of the base, using a multilayer slot coating die, and then, the other side of the base was coated with only the fusion layer slurry, using a single layer slot coating die. Water as the solvent in the separation membrane was evaporated through a drier, and the separation membrane was wound in a roll form.

The one side heat-resistant layer had a thickness of 3 µm, and the fusion layer had a thickness of 0.5 µm, respectively.

EXAMPLE 4

Example 4 was performed in the same manner as in Example 3 except that both the heat-resistant layer and the fusion layer were formed on both sides of the base layer.

EXAMPLE 5

A separation membrane and a battery of Example 5 were manufactured in the same manner as in Example 1 except that alumina particles having an average particle diameter of 0.45 µm were used for the heat-resistant layer of the separation membrane.

EXAMPLE 6

A separation membrane and a battery of Example 6 were manufactured in the same manner as in Example 1 except that alumina particles having an average particle diameter of 0.6 μm were used for the heat-resistant layer of the separation membrane.

COMPARATIVE EXAMPLE 1

A separation membrane and a battery were manufactured in the same manner as in Example 1 except that there was no fusion layer of the separation membrane.

COMPARATIVE EXAMPLE 2

A separation membrane and a battery were manufactured in the same manner as in Example 1 except that there was no heat-resistant layer of the separation membrane.

COMPARATIVE EXAMPLE 3

Comparative Example 3 was performed in the same manner as in Example 1 except that the separation membrane was manufactured as follows.

94 wt % of alumina particles having an average particle diameter of 1.0 μm, 2 wt % of polyvinyl alcohol having a melting temperature of 220° C. and a saponification degree of 99%, 4 wt % of acrylic latex having Tg of −52° C. were added to water as a solvent and stirred to prepare a uniform slurry for a heat-resistant layer.

Polymer particles including polyvinylidene fluoride-hexafluoropropylene (PVdF-HFP) having a melting temperature of 90° C. as a main component and maintaining a spherical shape having an average particle diameter of 0.2 μm when dispersed in water were diluted to a ratio of 20 wt % as compared to water, and used as a slurry for a fusion layer.

A polyethylene microporous membrane (SK LiBS) having a thickness of 9 μm manufactured by SK Innovation was used as a base for coating. The heat-resistant layer slurry and the fusion layer slurry were simultaneously coated on one side of the base, using a multilayer slot coating die, and then, the other side of the base was coated with only the fusion layer slurry, using a single layer slot coating die. Water as the solvent in the separation membrane was evaporated through a drier, and the separation membrane was wound in a roll form.

The one-sided heat-resistant layer had a thickness of 3 μm, and the both-sided fusion layer had a thickness of 0.5 μm, respectively.

COMPARATIVE EXAMPLE 4

Comparative Example 4 was performed in the same manner as in Comparative Example 3 except that both the heat-resistant layer and the fusion layer were formed on both sides of the base layer.

COMPARATIVE EXAMPLE 5

A separation membrane and a battery of Comparative Example 5 were manufactured in the same manner as in Example 1 except that alumina particles having an average particle diameter of 0.43 μm were used for the heat-resistant layer of the separation membrane.

COMPARATIVE EXAMPLE 6

A separation membrane and a battery of Comparative Example 6 were manufactured in the same manner as in Example 1 except that alumina particles having an average particle diameter of 0.35 μm were used for the heat-resistant layer of the separation membrane.

TABLE 1

| Classification | Unit | Example 1 | Example 2 | Example 3 | Example 4 | Example 5 | Example 6 |
|---|---|---|---|---|---|---|---|
| D1 | μm | 1.0 | 1.0 | 0.7 | 0.7 | 0.45 | 0.6 |
| D2 | μm | 0.3 | 0.3 | 0.15 | 0.15 | 0.3 | 0.3 |
| D1/D2 | — | 3.33 | 3.33 | 4.67 | 4.67 | 1.5 | 2.0 |
| Gas permeability | sec/100 cm$^3$ | 251 | 247 | 362 | 376 | 392 | 405 |
| Shrinkage ratio at 130° C. | % | 2.1 | 1.8 | 2.6 | 2.2 | 1.9 | 1.7 |
| Adhesive strength | gf/cm | 15.2 | 12.5 | 14.3 | 11.9 | 14.8 | 13.7 |
| Life time at room temperature | % | 87.1 | 88.2 | 85.3 | 86.9 | 82.9 | 85.3 |
| Increase rate in battery thickness | % | 1.1 | 1.2 | 1.1 | 1.1 | 1.1 | 1.2 |
| Ra | μm | 0.15 | 0.15 | 0.18 | 0.19 | 0.21 | 0.22 |
| Evaluation of penetration | | L3 (pass) | L3 (pass) | L3 (pass) | L3 (pass) | L3 (pass) | L3 (pass) |

TABLE 2

| Classification | Unit | Comparative Example 1 | Comparative Example 2 | Comparative Example 3 | Comparative Example 4 | Comparative Example 5 | Comparative Example 6 |
|---|---|---|---|---|---|---|---|
| D1 | μm | 1.0 | — | 1.0 | 0.7 | 0.43 | 0.35 |
| D2 | μm | — | 0.3 | 0.2 | 0.15 | 0.3 | 0.3 |
| D1/D2 | — | — | — | 5.0 | 4.67 | 1.43 | 1.17 |

TABLE 2-continued

| Classification | Unit | Comparative Example 1 | Comparative Example 2 | Comparative Example 3 | Comparative Example 4 | Comparative Example 5 | Comparative Example 6 |
|---|---|---|---|---|---|---|---|
| Gas permeability | sec/100 cc | 209 | 197 | 278 | 273 | 549 | 657 |
| Shrinkage ratio at 130° C. | % | 2.5 | 37.3 | 2.3 | 2.2 | 2.5 | 2.1 |
| Adhesive strength | gf/cm | Adhesion was not possible | 15.5 | 5.7 | 4.7 | 5.9 | 4.9 |
| Life time at room temperature | % | 58.3 | 85.7 | 63.3 | 65.4 | 67.9 | 62.3 |
| Increase rate in battery thickness | % | 9.7 | 1.2 | 5.9 | 6.2 | 6.1 | 5.9 |
| Ra | μm | 0.57 | 0.31 | 0.18 | 0.15 | 0.41 | 0.17 |
| Evaluation of penetration | | L3 (pass) | L5 (fail) | L3 (pass) | L3 (pass) | L3 (pass) | L3 (pass) |

($D_1$ is average particle diameter of inorganic particles of heat-resistant layer, $D_2$ is average particle diameter of polymer particles of fusion layer.)

From the above results, it was confirmed that at the time of simultaneously including the fusion layer composed of the crystalline polymer particles having a melting temperature of 100° C. or higher and the heat-resistant layer composed of the inorganic substance and the binder, the life time and the safety of the battery could be simultaneously satisfied. In addition, it could be appreciated that the results of Examples satisfying the above-described condition of $1.5 \leq D_1/D_2$ were excellent as compared to Comparative Examples.

While exemplary embodiments of the present disclosure have been shown and described above, the scope of the present invention is not limited thereto, and it will be apparent to those skilled in the art that modifications and variations could be made without departing from the scope of the present invention as defined by the appended claims.

The invention claimed is:

1. A composite separation membrane for a lithium secondary battery comprising:
   a porous base layer;
   a heat-resistant layer including inorganic particles connected and fixed by a binder polymer, and formed on the porous base layer, and
   a fusion layer including crystalline polymers in a form of particles having a melting temperature of 100° C. or higher, and formed on the heat-resistant layer, wherein the crystalline polymer comprises at least one selected from the group consisting of a crystalline polyvinylidene fluoride-based polymer and a crystalline polyacrylonitrile,
   wherein the inorganic particles and the crystalline polymer satisfy Equation 1 below:

$$1.5 \leq D1/D2 \quad \text{[Equation 1]}$$

in Equation 1, D1 is an average particle diameter of the inorganic particles of the heat-resistant layer, and D2 is an average particle diameter of the crystalline polymer particles of the fusion layer,
   wherein the composited separation member has a surface roughness (Ra) of 0.3 μm or less and 0.15 μm or more, and
   wherein the average particle diameter of the crystalline polymer particles is 0.15 μm to 0.8 μm.

2. The composite separation membrane for a lithium secondary battery of claim 1, further comprising:
   an interfacial layer formed between the heat-resistant layer and the fusion layer and having the inorganic particles and the crystalline polymer particles mixed therein.

3. The composite separation membrane for a lithium secondary battery of claim 1, wherein the heat-resistant layer includes one or two or more inorganic particles selected from alumina, boehmite, barium titanium oxide, titanium oxide, magnesium oxide, clay, glass powder, boron nitride, and aluminum nitride.

4. The composite separation membrane for a lithium secondary battery of claim 1, wherein the binder polymer of the heat-resistant layer is one or two or more selected from the group consisting of polyvinylidene fluoride, polyvinylidene fluoride-hexafluoropropylene, polymethyl methacrylate, polyacrylonitrile, polyvinylpyrrolidone, polyimide, polyethylene oxide, cellulose acetate, polyvinyl alcohol, carboxymethyl cellulose, and polybutyl acrylate.

5. The composite separation membrane for a lithium secondary battery of claim 1, wherein the heat-resistant layer has a thickness of 1 to 10 μm.

6. The composite separation membrane for a lithium secondary battery of claim 1, wherein the crystalline polymer further comprises a crystalline polystyrene.

7. The composite separation membrane for a lithium secondary battery of claim 1, wherein the fusion layer has a thickness of 0.1 to 2 μm.

8. A manufacturing method for the composite separation membrane for a lithium secondary battery of claim 1, said method comprising:
   applying a heat-resistant layer coating liquid including inorganic particles and a binder polymer to one side or both sides of a porous base; and
   applying a fusion layer coating liquid including a crystalline polymer in a form of particles having a melting temperature of 1000 C or higher on the applied heat-resistant layer coating liquid, wherein the crystalline polymer comprises at least one selected from the group consisting of a crystalline polyvinylidene fluoride-based polymer and a crystalline polyacrylonitrile, wherein an average particle diameter of the inorganic particles is 1.5 times or larger than an average particle diameter of the crystalline polymer particles, wherein the average particle diameter of the crystalline polymer particles is 0.15 μm to 0.8 μm, resulting in the composite separation membrane of claim 1.

9. The manufacturing method of claim 8, wherein the heat-resistant layer coating liquid is applied, and then the fusion layer coating liquid is applied without drying the heat-resistant layer coating liquid, thereby performing simultaneous coating.

* * * * *

UNITED STATES PATENT AND TRADEMARK OFFICE
CERTIFICATE OF CORRECTION

PATENT NO. : 10,985,356 B2
APPLICATION NO. : 15/562519
DATED : April 20, 2021
INVENTOR(S) : Dong Jin Joo et al.

Page 1 of 1

It is certified that error appears in the above-identified patent and that said Letters Patent is hereby corrected as shown below:

In the Claims

Column 16, Line 66, Claim 8, delete "1000 C" and insert -- 100° C. --

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*